C. A. O'DELL.
HAY RAKES AND LOADERS.
No. 195,838. Patented Oct. 2, 1877.
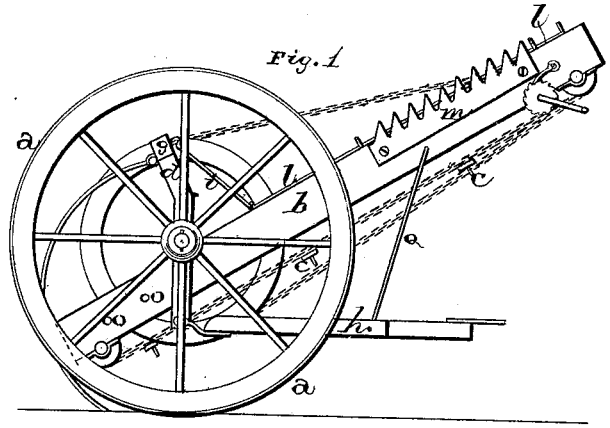
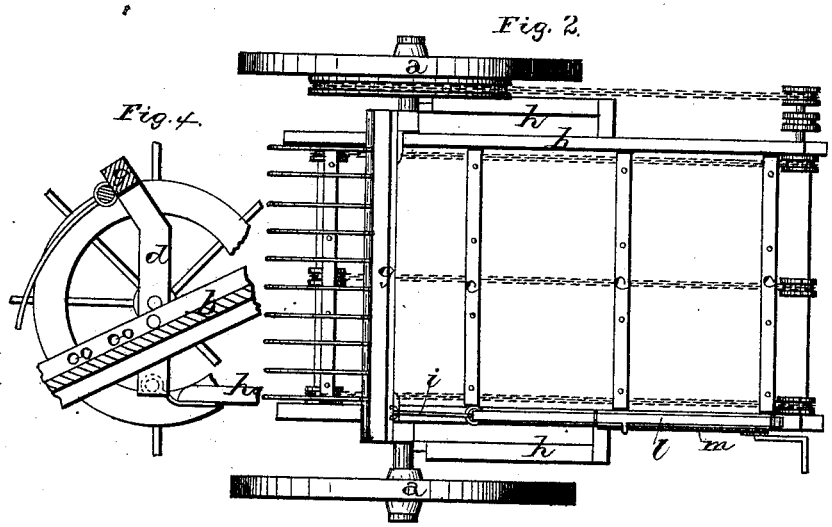
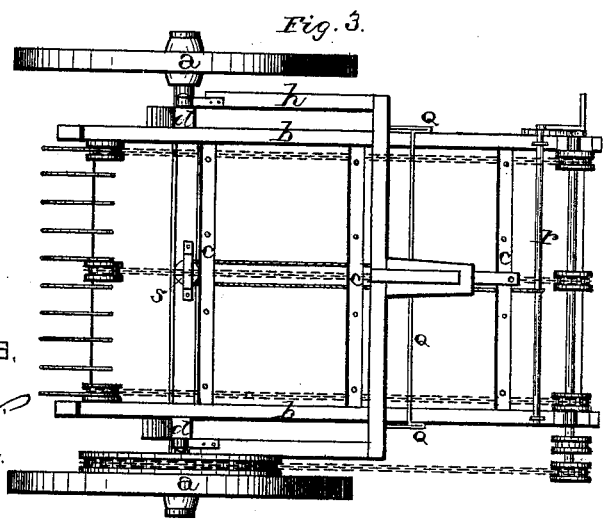
WITNESSES
INVENTOR
C. A. O'Dell
per
F. A. Lehmann
atty.

UNITED STATES PATENT OFFICE.

CHARLES A. O'DELL, OF JAMESTOWN, MICHIGAN, ASSIGNOR OF ONE-HALF HIS RIGHT TO FRANKLIN RICHARDSON, OF SAME PLACE.

IMPROVEMENT IN HAY RAKES AND LOADERS.

Specification forming part of Letters Patent No. 195,838, dated October 2, 1877; application filed August 27, 1877.

*To all whom it may concern:*

Be it known that I, CHARLES A. O'DELL, of Jamestown, in the county of Ottawa and State of Michigan, have invented certain new and useful Improvements in Combined Hay Rakes and Loaders; and I do hereby declare the following to be a full, clear, and exact description of the invention, such as will enable others skilled in the art to which it pertains to make and use it, reference being had to the accompanying drawings, which form part of this specification.

My invention relates to an improvement in combined hay rakes and loaders; and it consists in the arrangement and combination of devices that will be more fully described hereinafter, whereby the loader-frame is raised and lowered, and whereby the rake-teeth are raised above and lowered down to the ground.

The accompanying drawings represent my invention.

$a$ represents the driving-wheels, and $b$ the elevating-frame, over which the endless rake $c$ passes for carrying the hay from the ground up over the top end of the frame, in the usual manner. Instead of using an axle for connecting the two wheels together, as is usually done, the spindles, upon which the wheels turn, are cast upon the sides of the two levers $d$, which are pivoted upon the sides of the frame $b$, near its lower end. These levers stand almost vertically, and have their upper ends united together by means of the beam $g$, to the rear side of which the rake-head is secured. The lower ends of these levers are pivoted to the rear end of the frame $h$, as shown. Fastened to the front side of the connecting-beam $g$ is a rod, $i$, which has its front end fastened to the lower end of the lever $l$, which has a projection on its side for catching in the ratchet $m$. By pulling upward upon this lever $l$ the upper ends of the levers $d$ are drawn forward, thereby raising the teeth far enough above the ground to pass over any obstructions that may be in their way. By pushing downward upon this lever $l$ the levers $d$ are moved backward sufficiently far to bring the lower ends of the teeth in contact with the ground.

Through the sides of the lower end of the frame $b$ are made a number of holes, $o$, for the purpose of adjusting the levers $d$ back and forth, whereby the frame $b$ may have its lower end either lowered near to or raised above the ground, as circumstances may require, and thus brought nearer to or farther from the teeth.

Pivoted to the front end of the frame $h$ is the supporting bar or bars $q$, which are so shaped as to catch against the under side of the frame $b$, and support it at any suitable inclination desired.

In the upper end of the frame $b$ is the cranked shaft $r$, which is provided with a suitable pawl and ratchet for preventing it from unwinding. Fastened to this shaft is a cord or chain, which passes down around the pulley $s$, under the lower side of the frame $b$, and thence upward, and is fastened to the supporting-rods $q$.

By winding up upon the cranked shaft the rope or chain is made to draw the supporting-rod gradually backward, thereby forcing the upper end of the frame $b$ backward and upward to any desired height. By unwinding the cranked shaft the rope will be loosened, and the weight of the frame will push the supporting-rod $q$ forward until the upper end of the frame $b$ will be lowered downward to any desired distance.

Having thus described my invention, I claim—

1. The combination of the frame $b$, levers $d$, pivoted to the sides thereof and carrying the driving-wheels, and the frame $h$, having its rear end fastened to the lower end of the levers $d$, whereby the axle is dispensed with, substantially as described.

2. The frame $b$, having a series of holes, $o$, through its side, in combination with the levers $d$, whereby the lower end of the frame may be moved nearer to or farther from the ground and the rake-teeth, substantially as set forth.

3. The combination of the frames $h$ $b$, supporting-rod $q$, levers $d$, a rope or chain, and a shaft for winding the rope or chain upon, for the purpose of raising or lowering the upper end of the frame $b$, substantially as described.

In testimony that I claim the foregoing I have hereunto set my hand this 17th day of August, 1877.

CHARLES AUGUSTUS O'DELL.

Witnesses:
 ORIN DEWEY,
 ORVILLE DEWEY.